(12) United States Patent
Boadas et al.

(10) Patent No.: US 10,099,847 B2
(45) Date of Patent: Oct. 16, 2018

(54) SET FERMENTED DAIRY COMPOSITION IN A CIRCULAR CONTAINER

(75) Inventors: Michelle Boadas, Barcelona (ES); Francisco Bove Bonet, Barcelona (ES)

(73) Assignee: DANONE S.A., Barcelona (ES)

( * ) Notice: Subject to any disclaimer, the term of this patent is extended or adjusted under 35 U.S.C. 154(b) by 0 days.

(21) Appl. No.: 14/110,062

(22) PCT Filed: Apr. 4, 2012

(86) PCT No.: PCT/EP2012/056126
§ 371 (c)(1),
(2), (4) Date: Oct. 4, 2013

(87) PCT Pub. No.: WO2012/136687
PCT Pub. Date: Oct. 11, 2012

(65) Prior Publication Data
US 2014/0030378 A1  Jan. 30, 2014

Related U.S. Application Data

(60) Provisional application No. 61/473,060, filed on Apr. 7, 2011.

(51) Int. Cl.
*B65D 85/72* (2006.01)
*B65D 1/26* (2006.01)
*B65D 25/10* (2006.01)
*A23C 9/123* (2006.01)

(52) U.S. Cl.
CPC .......... *B65D 85/72* (2013.01); *A23C 9/123* (2013.01); *B65D 1/26* (2013.01); *B65D 25/10* (2013.01)

(58) Field of Classification Search
CPC .......... B65D 1/26; B65D 25/10; B65D 85/72; A23V 2002/00
USPC .................................................. 426/8, 130
See application file for complete search history.

(56) References Cited

U.S. PATENT DOCUMENTS

| | | | | |
|---|---|---|---|---|
| 3,430,411 A | * | 3/1969 | Ollier et al. ............... 53/453 |
| 4,058,630 A | * | 11/1977 | Corbic nee Busnel ..................... A01J 25/115 426/130 |
| 4,154,345 A | * | 5/1979 | Davis ................ B65D 17/161 206/527 |
| 4,225,623 A | * | 9/1980 | Stussi .................. A23C 9/133 426/130 |
| 4,297,161 A | * | 10/1981 | Graffin .................. B29C 65/18 100/211 |
| 4,550,854 A | * | 11/1985 | Schellenberg ........ B29C 51/162 220/62.2 |
| 4,919,268 A | * | 4/1990 | Young et al. ................ 206/509 |
| 6,793,950 B1 | * | 9/2004 | Archibald et al. ........... 426/130 |
| 2003/0155559 A1 | * | 8/2003 | Connor et al. ................ 252/589 |
| 2007/0125742 A1 | * | 6/2007 | Simpson, Jr. .......... B67C 3/045 215/376 |
| 2009/0011081 A1 | * | 1/2009 | Lin .......................... A23C 9/12 426/43 |
| 2009/0229704 A1 | | 9/2009 | Simpson et al. |
| 2012/0251679 A1 | * | 10/2012 | Ferry ..................... B65D 1/26 426/130 |
| 2014/0004233 A1 | * | 1/2014 | Ferry ..................... B65D 1/26 426/130 |

FOREIGN PATENT DOCUMENTS

| | | |
|---|---|---|
| JP | H0429907 U | 3/1992 |
| JP | 2001-122332 A | 5/2001 |
| JP | 2001-146262 A | 5/2001 |
| WO | 2007 055730 | 5/2007 |
| WO | WO 2007055730 A1 * | 5/2007 |
| WO | WO 2009/150124 A1 | 12/2009 |

OTHER PUBLICATIONS

International Search Report dated Jun. 1, 2012 in PCT/EP12/056126 filed Apr. 4, 2012.

* cited by examiner

*Primary Examiner* — Bhaskar Mukhopadhyay
(74) *Attorney, Agent, or Firm* — Oblon, McClelland, Maier & Neustadt, L.L.P.

(57) ABSTRACT

A food product and process of making the food product, the food product including a thermoplastic container and a set fermented dairy composition. The body of the container, which defines an interior volume, includes a bottom and a side wall extending along a longitudinal axis from the bottom as far as a top. The side wall has an annular and preferably circular cross-section. The dairy composition is in contact with an interior surface of the bottom and with a projection element that protrudes inside the container. The projection element prevents rotation of the dairy composition. The projection element is arranged to define an irregular annular area between the projection and the side wall.

17 Claims, 3 Drawing Sheets

SET FERMENTED DAIRY COMPOSITION IN A CIRCULAR CONTAINER

FIELD OF THE INVENTION

The present invention generally relates to containers used in food packaging industry, particularly to thermoformed plastic optionally flanged containers, such as yoghurt pots or similar. The invention also concerns a pack comprising such optionally flanged containers. The invention relates to containers that are especially adapted to set fermented dairy compositions.

More particularly, the invention relates to a product comprising a food composition and a container for the food composition,
- the container comprising thermoplastic hollow body comprising a bottom and a side wall extending along a longitudinal axis from said bottom as far as a top, said hollow body defining an interior volume and said bottom having an interior surface, said side wall of the hollow body has an annular and preferably circular cross-section perpendicularly to a common said longitudinal axis, said bottom having a circular peripheral edge, and
- the food composition being a set fermented dairy composition in the interior volume and in contact with said interior surface of the bottom.

BACKGROUND OF THE INVENTION

It is known to produce such a container, and in particular a yoghurt pot or similar, by means thermoforming a sheet of plastic to form the volume. Typically, the plastic sheet is heated and then drawn into a cavity such as by vacuum and/or pressure. As the sheet is drawn into the cavity, the thickness of the portion of the sheet drawn into the cavity is reduced as the sheet material is stretched into the cavity. With such a method, the side wall of the body is thin, while the flange has the same thickness and the same rigidity as the original sheet of plastic.

The plastic containers are conventionally sealed with membranes and can be manufactured and sold in a multiple portion packaging tray comprising an array of separable containers. The containers are generally arranged in layers of four, six or eight pots, the containers being connected to one another along their flanges. The French patent FR 2 432 975 describes a pack of plastic flanged containers, in which an individual container may be removed by tearing a separation region provided between two adjacent flanges. After separation, each container flange still has four outer side edges so as to keep integrity of the content. These containers work well when made of relatively brittle plastic. Use of less brittle or more pliable polymers makes the containers more difficult to break apart. Such a difficulty may cause escape of the content when breaking other parts of the container.

In food packaging industry, the plastic containers can be stacked on top of one another so as to form stacks which can be layered on a pallet. A loading weight on a pallet may be much more than 500 kg. Such stacks allow the packaging items at the bottom to withstand the compressive load of the packaging items on top. The plastic containers layers are typically stored in cardboard trays each having a bottom and side walls preventing lateral tilting of the layers.

Set fermented dairy compositions are known. For these compositions fermentation of milk is typically performed in the container, allowing setting of milk proteins and formation of whey that stays in the container. Presence of whey is usually not appreciated by consumers; there is always a concern to reduce the amount of whey or at least the perception of whey in products comprising a set fermented dairy composition in a container.

It has been surprising found that the amount of whey, or at least the perception thereof, is increased when the container has a circular shape. There is a need for products comprising a set fermented dairy composition and a circular shape plastic container, that present a reduced increase of whey or perception thereof.

SUMMARY OF THE INVENTION

The invention addresses at least one of the needs above with a product comprising a food composition and a container for the food composition,
- the container comprising a thermoplastic hollow body comprising a bottom and a side wall extending along a longitudinal axis from said bottom as far as a top, said hollow body defining an interior volume and said bottom having an interior surface, said side wall of the hollow body having an annular and preferably circular cross-section perpendicularly to the longitudinal axis, said bottom having a circular peripheral edge, and
- the food composition being a set fermented dairy composition in the interior volume and in contact with the interior surface of the bottom, wherein the interior surface comprises a projection element protruding inside the container and preventing rotation of the food composition.

It has been surprisingly found that such a product can present a lower amount of whey, compared to a product comprising a container that cannot prevent rotation. Without being bound to any theory it is now believed that rotation of the set fermented dairy composition can allow release of more whey. This surprising explanation allows designing improved containers with the projection element. It is understood that the projection element is not arranged symmetrically around the longitudinal axis and defines at least two distinct kind of surface portions to allow the anti-rotation effect.

According to a particular feature, the projection element has a circular shape and defines a top surface substantially perpendicular to an axis different from the longitudinal axis or the projection has a non circular shape.

According to another particular feature, the bottom defines a base plane. The projection element may define an embossment from the base plane. With this arrangement, the container can be stacked in a compact manner as there is no part protruding from the outer surface of the bottom that can be used to support the container in a vertical position.

It is also provided according to the invention a process of making the above mentioned product, the process comprising the following steps:
a) providing a mixture comprising milk and lactic acid bacteria, the mixture having a setting pH, a milk treatment being preferably performed, lactic acid bacteria being preferably added in the treated milk,
b) filling a container as defined in any of the preceding claims with the mixture,
c) allowing fermentation in the container of the milk by the lactic acid bacteria to a final pH lower than setting pH, whereby a set fermented dairy composition is obtained,
d) recovering the product comprising the set fermented dairy composition in the container, the container being sealed, for instance between step b) and step c), possibly by fixing a seal membrane onto the upper face of a flange of the container.

DETAILED DESCRIPTION OF THE INVENTION

Figure 1:
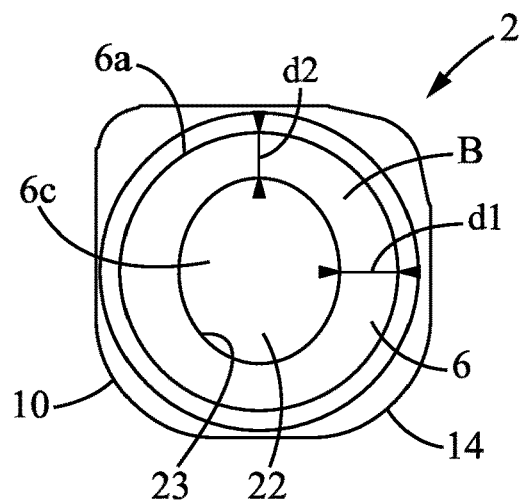
FIG. 1 is a bottom view of food container according to a first preferred embodiment of the invention.

Some preferred embodiments can appear in the description of the figures below. In the various figures, the same references are used to designate identical or similar elements.

Set fermented dairy compositions M are known by the one skilled in the art. Set fermented dairy compositions M are preferably set fermented milk compositions, for examples set yogurts. It is mentioned that yogurts are considered as being specific fermented milk products. Such compositions present a firm texture due to coagulation and setting of milk proteins at lower pH. Such compositions cannot be considered as liquid.

The composition is a fermented product and thus comprises microorganisms, such as lactic acid bacteria and/or probiotics (the probiotics can be lactic acid bacteria). These are also referred to as ferments or cultures or starters. Lactic acid bacteria are known by the one skilled in the art. Probiotics are also known by the one skilled in the art. Examples of probiotics include some Bifidobacteria and Lactobacilli, such as *Bifidobacterium brevis, Lactobacillus acidophilus, Bifidobacterium animalis, Bifidobacterium animalis lactis, Bifidobacterium infantis, Bifidobacterium longum, Lactobacillus casei, Lactobacillus casei paracasei, Lactobacillus reuteri, Lactobacillus plantarum, Lactobacillus rhamnosus.*

Fermented animal milk products are known by the one skilled in the art. Such products are products made from animal milk (with further additives), having undergone a fermentation step. The fermentation is typically done with microorganisms such as bacteria and/or yeast, preferably at least bacteria preferably lactic acid bacteria, and leads to production of fermentation products, for example lactic acid and/or to multiplication of the microorganisms. The designation "fermented milk" can depend on local legislation, but is typically given to a dairy product prepared from skimmed or full fat milk, or concentrated or powdered milk, having undergone a heat treatment at least equivalent to a pasteurization treatment, and inoculated with lactic acid producing micro-organisms such as Lactobacilli (*Lactobacillus acidophilus,* Lb. *casei,* Lb. *plantarum,* Lb. *reuteri,* Lb. *johnsonii*), certains Streptococci (*Streptococcus thermophilus*), Bifidobacteria (*Bifidobacterium bifidum, B. longum, B. breve, B. animalis*) and/or Lactococci (*Lactococcus lactis*).

The fermentation of milk by lactic acid bacteria produced lactic acid that causes the pH to decrease to a setting pH. In set fermented dairy composition M, the fermentation is performed in a container 2. Thus the firm set texture is kept without stirring. Fermented dairy compositions M comprise milk, preferably animal milk, preferably cow milk, and lactic acid bacteria. They can comprise also fermentation metabolite, including lactic acid. They can comprise also some additive, such as aromas, flavours, sugar, sweeteners, and rheology modifying agents. Such products are typically different from gelled milk because they comprise lactic acid bacteria and/or they are not in a gel state (elastic rheology), and/or they do not comprise gelling agents such as gellan.

The composition can be prepared by any appropriate process. Such process typically involve treating milk (optionally introduced in the form of a powder then mixed with water), for example by pasteurization and homogenization, and then allowing a fermentation (after addition of ferments). Fermentation allows a decrease of the pH with production of lactic acid by the lactic acid bacteria. Under a setting pH (usually of from 4 to 5) proteins coagulate, to form a set product.

Figure 2:
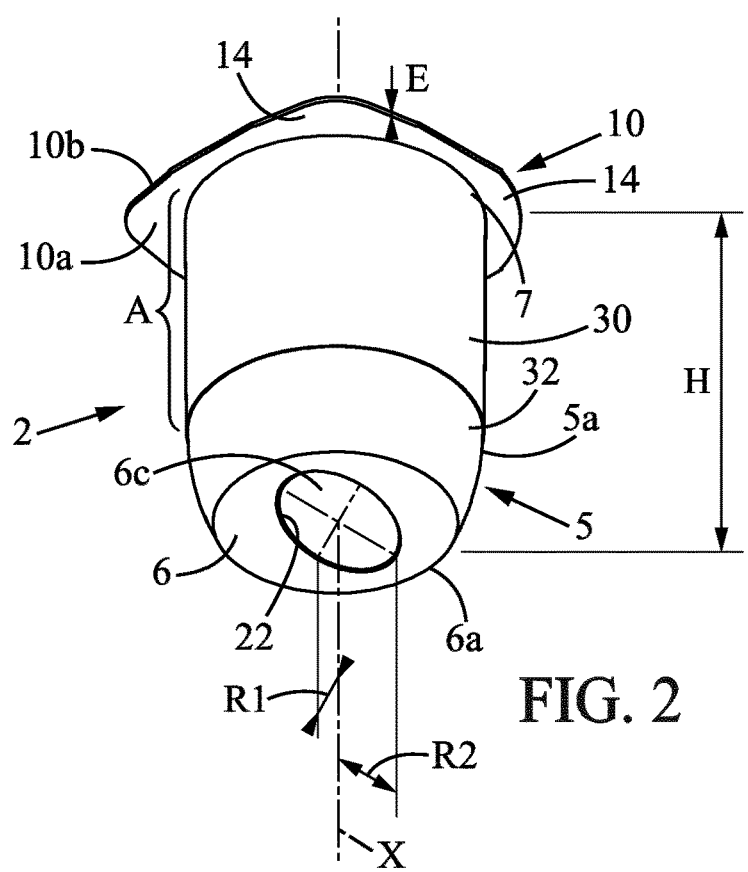
FIG. 2 is perspective view showing an individual container according to a preferred embodiment of the invention.

In one embodiment the invention relates to a process of making the product comprising the following steps:
step a) providing a mixture comprising milk and lactic acid bacteria,
step b) filling a container 2 as shown in FIG. 2 with the mixture,
step c) allowing fermentation in the container 2 of the milk by the lactic acid bacteria to a final pH lower than setting pH,
step d) recovering the product comprising the set fermented dairy composition M in the container 2.

Step a) can comprise a milk treatment step, and an inoculation step wherein lactic acid bacteria are added in the treated milk. The milk treatment step can comprise pasteurizing and homogenizing.

Figure 5:
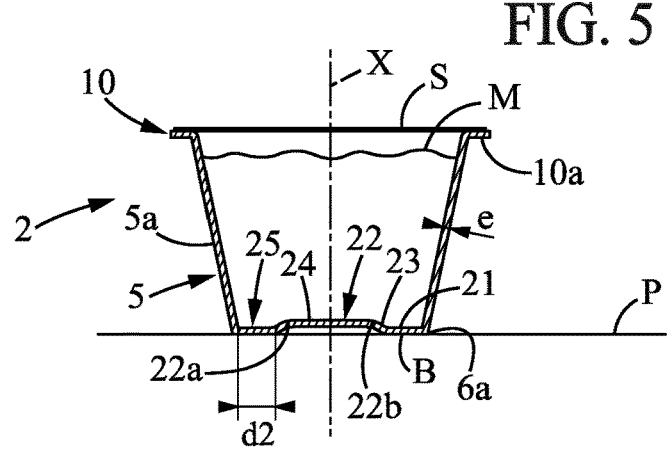
FIG. 5 shows a sectional view of the product according to the invention where a container having the same bottom as in FIG. 4 is filled with the dairy composition and sealed.

It can be appreciated that the container 2 is typically sealed between step b) and step c), using a membrane seal S as shown in FIG. 5.

Fermentation at step c) can be performed for examples at a temperature of from 30 to 50° C., preferably of from 35 to 45° C.

The final pH may be lower than 5, preferably lower than 4.5, preferably higher than 3.5, preferably higher than 4.

Referring to FIGS. 1 and 2, the container 2 can be provided with a cup-shaped hollow body 5 and comprises a bottom 6 at the opposite of the flange 10. The container 2 is a one piece thin-walled container formed by deep-drawing operations. The thermoplastic material of the container 2 may be selected from polystyrene or poly lactic acid polymers. The container 2 is preferably polystyrene container.

The container 2 here comprises a generally planar annular flange 10 integral with the body 5 and connected to the top 7 of the body 5. Such a flange 10 is advantageous to form packs of several individual containers 2. In a pack configuration, at least four containers 2 are typically arranged in two rows, with the flanges 10 of each of the containers 2 of the pack being integrally formed and separably joined to each other at a junction of two flange portions of two distinct containers 2 of the pack. The flanges 10 may have an identical shape in all the containers 2 of the pack. Of course the number of containers 2 may vary and a number of 2, 6, 8, 10 or 12 containers 2 may be provided, in a non-limitative example. The containers 2 are arranged in at least one row, and preferably at least in two rows when the pack 1 comprises four or more containers 2.

Figure 3:
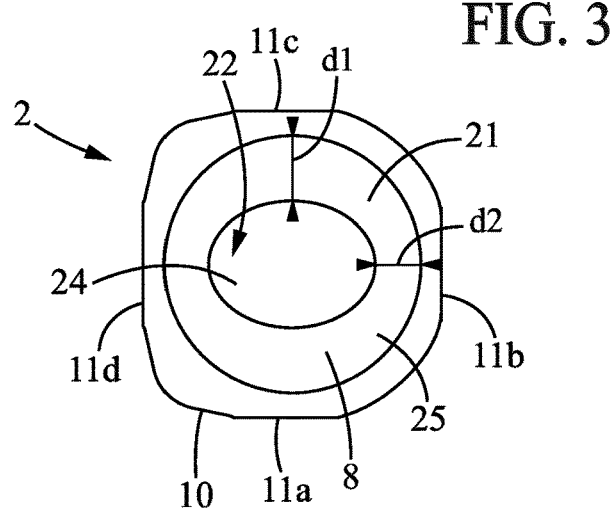
FIG. 3 is a top view showing the individual container of FIG. 1 before filling.

As shown in FIGS. 2 and 3, the flange 10 comprises a lower face 10a, an upper face 10b, an inner edge defining a generally circular upper opening 8 of the container 2 and outer straight side edges 11a, 11b, 11c, 11d. The outer straight side edges 11a, 11b, 11c, 11d comprise here two parallel outer straight side edges 11a, 11c and at least one outer straight side edge 11b, 11d perpendicular to the two parallel outer straight side edges 11a, 11c. This shape of the flange 10, with corner portions 14 and outer straight side edges 11a, 11b, 11c, 11d, is useful for easy removing the membrane seal S and easy separation of the containers 2 from a pack of several containers 2. The circular cross section of the body 5 of the container 2 is also advantageous, in particular because operation using a spoon for retrieving the whole content is easier.

As clearly apparent in FIG. 2, the height H of the container 2 is essentially defined by the side wall 5a of the body 5. Indeed, the bottom 6 does not extend below the side wall 5a and the flange 10 does not extend above the top 7 of the body, the membrane seal S having such a flat configuration and low thickness that its vertical size is not apparent for the ordinary user.

The hollow body 5 has a side wall 5a extending along a longitudinal axis X from a bottom 6 as far as an open top 7. The bottom 6 has a circular peripheral edge 6a, from which the side wall 5a extends. The body 5 has a circular section in cross-section and extends symmetrically around said longitudinal axis X. More generally, the side wall 5a of the body 5 may be tubular and is adapted to be covered by a cylindrical decorative strip, sticker or banderol in the upper area A adjacent to the upper body opening. Here, this opening is a circular opening 8. It is understood that the longitudinal axis X is here a central axis for the body 5 and the opening 8. Fixing of the strip is performed in a known manner.

Referring to FIGS. 1-5, the bottom 6 of the container 2 comprises an annular bearing portion B that extends in a base plane P. The external perimeter of the bearing portion B is here defined by the circular peripheral edge 6a of the bottom 6. In embodiments shown in FIGS. 1-5, the inner edge of the bearing portion B has at least one shape parameter distinct from the circular peripheral edge 6a. As shown in FIGS. 1-2, the bottom 6 is provided with a with a concave wall portion or cavity 6c of the bottom 6 that defines a hollow at the opposite of the interior volume of the container 2. The cavity 6c is surrounded by the bearing portion B.

In the preferred embodiment as shown in FIGS. 1-3, the bottom 6 may be provided with only one cavity 6c with a concavity oriented to the exterior. Here, the cavity 6c has an oval shape with a major axis and a minor axis. The major axis is here comprised in a first median plane of the bottom 6, while the minor axis is here comprised in a second median plane of the bottom 6, which is perpendicular to the first median plane.

Now considering the interior face 21 of the bottom 6 as shown in FIG. 3, a projection element 22 is defined on the interior surface 21. This projection element 22 protrudes from the base plane P defined by the bottom 6 inside the container 2. This arrangement with a projection having significant dimensions prevents rotation of the fermented dairy composition M. With such a configuration and as shown in FIG. 3, the interior surface 21 of the bottom 6 comprises in a central area thereof a projection element 22 protruding inwardly. Here the projection element 22 has an oval shape or similar non circular curved shape, perpendicular to the longitudinal X. Such a shape without any rectilinear edges or angles is preferred because the body 5 of the container 2 is easy to remove from the mold cavities. The projection element 22 is also arranged at a distance from the circular peripheral edge 6a of the bottom 6. With such a position of the projection element 22, the bearing portion B has an annular outer surface that extends around the projection element 22. This annular outer surface is planar (horizontal as shown in FIG. 5) to easily obtain a vertical position for the container 2. The base plane P defined by the bottom 6 is typically parallel to the flange 10 and perpendicular to the longitudinal axis X, which is here a central axis of the body 5 of circular cross-section. The thickness of the bottom 6 is preferably slightly constant.

Referring to FIGS. 1-5, the projection element 22 defines an embossment from the base plane P, which has a convex perimeter (here an oval perimeter). An oval profile is preferred but a bi-lobed profile (as the shape of "8") could be also used. It can be appreciated that the projection element 22 thus has a length (or larger diameter) and a width (or smaller diameter), the width being inferior to the length. Alternatively, the embossment defined by the projection element 22 can have a square shape, defining a squared substantially planar top 24 perpendicular to the longitudinal axis X. The projection element 22 defines a single projection of said interior surface 21 of the bottom 6. The interior surface 21 of the bottom 6 is provided with a single projection element 2. Accordingly, there is only one concave wall portion 6c that is intersected by the longitudinal axis X in the bottom 6 as shown in FIGS. 2 and 5. With only a continuous annular groove 25 forming the deepest area where the last portions of the fermented dairy composition have to be retrieved; operation with a conventional spoon is facilitated. As shown in FIG. 2, the lower portion 32 of the side wall 5a is tapering in a curved manner toward the bottom 6, thus also facilitating operation with the spoon to fully retrieve the fermented dairy composition M.

Figure 4:
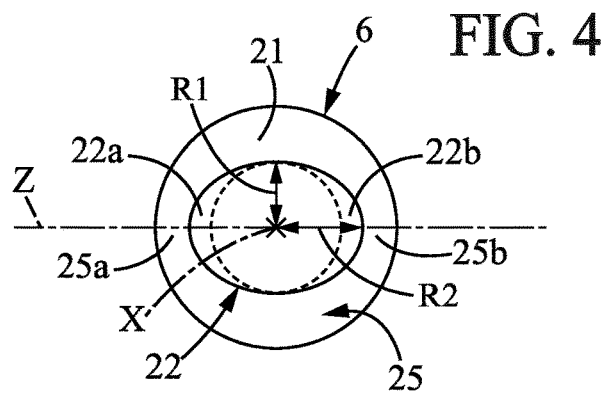
FIG. 4 is a detail from FIG. 3 showing the projection element in the bottom.

More generally, any compact shape of the projection element 22 which provides two distinct radial sizes R1, R2 measured in a same plane perpendicularly to the longitudinal axis X can be used. The projection element 22 can thus define an irregular annular area between the single embossment and the side wall 5a. Referring to FIGS. 3-4, the following relation is satisfied:

$$R1+d1=R2+d2$$

where d1 is the greatest radial distance between the projection element 22 and the circular peripheral edge 6a, d2 is the lowest radial distance between the projection element 22 and the circular peripheral edge 6a, and where R1 is the radial size of the projection element 22 measured from the longitudinal axis X according to the same radial direction than for measurement of the distance d1, and R2 is the radial size of the projection element 22 measured from the longitudinal axis X according to the same radial direction than for measurement of the distance d2.

Referring to FIGS. 3-5, the continuous annular groove 25 defined between the projection element 22 and the side wall 5a of the hollow body 5 can be filled by the fermented dairy composition M and does not reduce access to this composition. It is believed that such an annular groove 25 having an irregular width is useful to prevent rotation of the fermented dairy composition M. The projection element 22 may comprise a globally planar top 24 and one or more side walls 23. In the exemplary embodiment shown in FIG. 1, the projection element 22 has a side wall 23 with same or similar inclination as the side wall 5a of the hollow body 5. This non-circular side wall 23 here extends longitudinally around the longitudinal axis X from the base plane P defined by the bearing portion B of the bottom 6 as far as the planar top 24. In a non limiting example, the planar top 24 preferably does not comprise any grooves or hollows to facilitate full retrieving of the dairy fermented composition M.

The continuous annular groove 25 comprises one and preferably two portions 25a, 25b as shown in FIG. 4 of reduced width. In the illustrative embodiment of FIG. 4, the two portions 25a and 25b are diametrically opposed and arranged adjacent opposite ends 22a and 22b of the projection element 22. The ends 22a, 22b are here arranged at the radial distance d2 from the circular peripheral edge 6a, this radial distance d2 corresponding to a local reduction of the width of the groove 25. It can be seen that this radial distance d2 corresponds to a minimum distance between the side wall 5a of the body 5 and the side wall 23 of the projection element 22. The radial distance d1 corresponds to the maximum distance between the side wall 5a of the body 5 and the side wall 23 of the projection element 22.

As shown in FIG. 4, the ends 22a and 22b arranged beyond the dashed lines correspond to two outgrowths or extensions of the projection element 22 that extend parallel to an axis Z perpendicular to the longitudinal axis X, in opposite directions. The two ends 22a and 22b defined as extensions of a central embossment are efficient for preventing rotation of the fermented dairy product M about a vertical axis. As apparent from FIGS. 2, 5 and 7, the side wall 5a is substantially not corrugated to prevent lost of fermented dairy product M during retrieving operation with the spoon.

Figure 6:
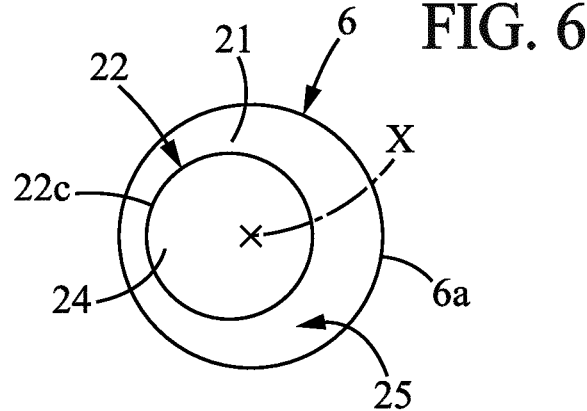
FIG. 6 is a view similar to FIG. 4 showing another kind of projection element having in the bottom according to the invention.

In the embodiment shown in FIG. 6, the projection element 22 may be provided with a circular shape around a symmetry axis which is distinct from the longitudinal axis X, for instance an axis radially offset relative to the longitudinal axis X or slightly inclined. In this latter case, the projection element 22 defines a shifted planar top 24 that is intersected by the longitudinal axis X, as shown in FIG. 6. The projection element 22 has a portion 22c that is proximal with respect to the side wall 5a of the body 5, while the other portion (central portion in the bottom 6) that is intersected by the longitudinal axis X is distal with respect to the side wall 5a.

In the embodiments shown in FIG. 1-6, it can be appreciated that the projection element 22 has a height preferably lower than 4 or 5 mm and protrudes inwardly without significantly limiting access to the fermented dairy product M. In the bottom 6, the thickness may be identical or larger than in the side wall 5a of the body 5. For instance, the thermoplastic used in the container 2 has a thickness e of about 0.2 mm in the body 5 (in particular in the side wall 5a) and a thickness E of about 0.85 mm in the flange 10. The thickness may vary depending upon the food packaging application and may be inferior to 1 mm and superior to 0.7 mm (the range 0.8-0.9 mm being preferred). Thicker materials may be used for heavier food products. The membrane seal S used to cover the container 2 and to seal the opening 8 essentially comprises a film thinner than the side wall 5a of the body and more flexible. Such a membrane seal S may be a plastic film made from plastic resin or a foil film. An adhesive may be used to seal the film to the upper face 10b of the flange 10. The membrane seal S, which is fixed only to the upper face 10b of the flange 10 entirely covers this upper face 10b.

Figure 7:
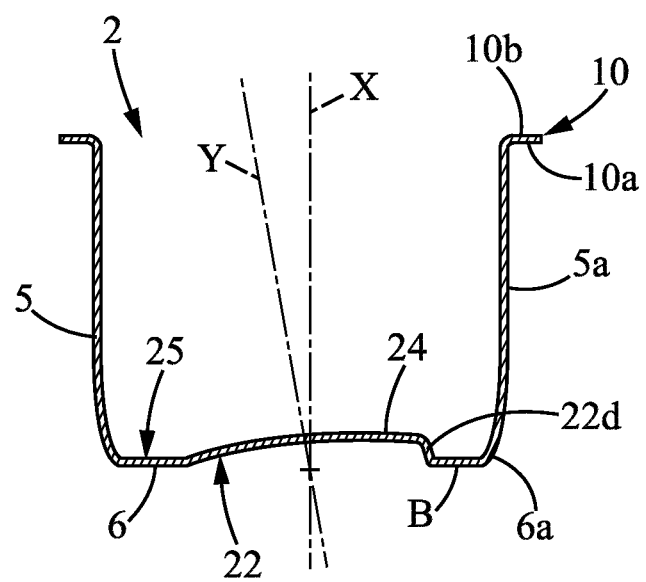
FIG. 7 shows a sectional view of a container provided with a tilted projection element.

Now referring to FIGS. 2, 4 and 6-7, the container 2 can have one or several of the following features:

the side wall 5a of the body 5 has a generally cylindrical upper portion 30, possibly covered by a decorative strip, and a lower portion 32 tapering from the upper portion 30 toward the bottom 6, the projection element 22 comprises a substantially planar top 24, the ratio between the surface defined by the planar top 24 and the interior surface 21 of the bottom 6 is at least equal to 1:6, and preferably at least equal to 1:5, the ratio between the surface defined by the planar top 24 and the interior surface 21 (i.e. the top surface of the bottom 6) is at least equal to 1:4 and not superior to 1:1.5, whereby the radial distance d2 may be efficiently reduced locally, as shown in the alternative embodiment of FIG. 7, the projection element 22 may have a circular shape and defines a planar top (planar surface) substantially perpendicular to an axis Y different from the longitudinal axis X.

In the embodiment of FIG. 7, the projection element 22 has a narrow annular margin part provided with a portion 22d that is locally more distant vertically (i.e. axially) with respect to the bearing portion B and which defines a locally deeper portion of the groove 25 and an angle more pronounced (i.e. not far from 90°, for instance comprised between 45 and 90°) at the intersection between the bearing portion B and the projection element 22. It is understood that the continuous annular groove 25 has not a regular geometry with such a configuration of the projection element 22. Alternatively, the perimeter line of the projection element 22 of the type as shown in FIG. 7 can be non circular.

The fermented dairy composition M is preferably present in an amount of from 50 to 500 g, preferably not inferior to 75 or 80 g and not superior to 400 g, and more preferably not inferior to 100 g and not superior to 200 g. This composition preferably represents at least 80%, preferably at least 90% of the inner volume of the container 2. A fermented dairy composition having a weight comprised between 100 and 200 g, from example between 100 and 150 g, for example 125 g is highly preferred.

The present invention has been described in connection with the preferred embodiments. These embodiments, however, are merely for example and the invention is not restricted thereto. It will be understood by those skilled in the art that other variations and modifications can easily be made within the scope of the invention as defined by the appended claims, thus it is only intended that the present invention be limited by the following claims.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. A product comprising:
a food composition; and
a container for the food composition;
the container comprising a thermoplastic hollow body comprising a bottom and a side wall extending along a longitudinal axis from the bottom as far as a top, the bottom comprising a single annular bearing portion that defines a base plane, the top being provided with an opening, the hollow body defining an interior volume and the bottom having an interior surface narrower than the top, the side wall of the hollow body having a cross-section perpendicularly to the longitudinal axis, the side wall and the bottom being part of a same thermoplastic piece, the bottom having an outer circular peripheral edge in the base plane, the outer circular peripheral edge defining a perimeter of the bearing portion; and the food composition, being a set fermented dairy composition having a firm texture, the set fermented dairy composition being positioned in an interior volume of the container and in contact with the interior surface of the bottom;

wherein the side wall comprises a lower portion tapering in a curved manner toward the bottom, wherein the interior surface of the bottom comprises a projection element projecting up from the base plane to a projection top that is planar intersected by the longitudinal axis, and wherein the projection element is in contact with the set fermented dairy composition, and protrudes inside the container, an outermost non-circular peripheral edge line of the projection element being defined in the base plane at an annular intersection of the projection element and the bearing portion so that spacing between the side wall of the hollow body and the non-circular peripheral edge line of the projection element varies and the projection element is provided with two different radial sizes in the base plane that extends perpendicularly to the longitudinal axis, the projection element provided with the two different radial sizes protruding inside the container to prevent rotation of the set fermented dairy composition;

wherein the projection element is spaced radially from the side wall and from the outer circular peripheral edge of the bottom, and wherein the projection element defines an embossment from the base plane having a height lower than 4 mm, wherein the projection element defines a planar top, and a ratio between the surface defined by the planar top and an interior surface of the bottom being at least equal to 1:5.

2. The product according to claim 1, wherein the embossment has an oval or square shape when observed through the opening after removal of the food composition.

3. The product according to claim 1, wherein the projection element has an oval shape perpendicular to the longitudinal axis, the two different radial sizes in the base plane being measured along perpendicular directions.

4. The product according to claim 1, wherein the side wall of the hollow body has a circular cross-section perpendicularly to the longitudinal axis.

5. The product according to claim 1, wherein a continuous annular groove filled by the dairy composition is defined between the projection element and the side wall of the hollow body.

6. The product according to claim 5, wherein the continuous annular groove comprises two portions with a minimum distance between the side wall of the body and the side wall of the projection element.

7. The product according to claim 5, wherein the projection element defines a single projection of the interior surface of the bottom.

8. The product according to claim 1, wherein the ratio between the surface defined by the planar top and the interior surface of the bottom being at least equal to 1:4 and not greater than 1:1.5.

9. The product according to claim 1, wherein the set fermented dairy composition is a set yogurt.

10. The product according to claim 1, wherein the food composition has a weight not less than 50 g and not more than 500 g.

11. A product comprising:
a food composition;
a container for the food composition, the container including a single opening and a planar annular flange surrounding the single opening: and
a membrane seal adhering to an annular top surface of the planar flange to close the single opening;
the container comprising a thermoplastic hollow body comprising a bottom and a side wall extending along a longitudinal axis from the bottom as far as a top provided with the single opening, the single opening being wider than the bottom, the hollow body defining an interior volume and the bottom having an interior surface, the side wall of the hollow body having a cross-section perpendicularly to the longitudinal axis, the side wall and the bottom being part of a same thermoplastic piece;
wherein the side wall comprises a lower portion tapering in a curved manner toward the bottom,
wherein the food composition comprises a set fermented dairy composition in contact with the interior surface of the bottom and extends in the interior volume;
wherein the bottom has an outer circular peripheral edge and the interior surface comprises a projection element, in contact with the set fermented dairy composition; and
wherein the projection element protrudes inside the container and is provided with a non-circular peripheral edge line formed in the base plane to prevent rotation of the set fermented dairy composition, the projection element comprising a projection top perpendicular to the longitudinal axis and without a hollow,
wherein the projection element is spaced radially from the side wall and from the outer circular peripheral edge of the bottom, and wherein the projection element defines an embossment from the base plane having a height lower than 4 mm,
wherein the projection element defines a planar top, and a ratio between the surface defined by the planar top and an interior surface of the bottom being at least equal to 1:5.

12. The product of claim 11, wherein the bottom comprises a single annular bearing portion that defines a base plane, the outer circular peripheral edge of the bottom being continuously rounded and defining a perimeter of the bearing portion, and wherein the projection element projects up from the base plane to the projection top that is planar and intersected by the longitudinal axis.

13. The product of claim 11, wherein the food composition has a weight not less than 50 g and not more than 500 g, and wherein the interior volume is undivided to define a single passage from the single opening to the bottom and allow full retrieval by a spoon of the content.

14. The product of claim 11, wherein a continuous annular groove filled by the dairy composition is defined between the projection element and the side wall of the hollow body.

15. The product of claim 14, wherein the bottom comprises a bearing portion without any element protruding axially outwards so that the bearing portion defines a planar ring surrounding the projection element.

16. The product of claim 11, wherein the bottom has a constant thickness.

17. A product comprising:
a food composition: and a container for the food composition, the container including a single opening; the container comprising a thermoplastic hollow body comprising a bottom and a side wall extending along a longitudinal axis from the bottom as far as a top provided with the single opening, the single opening being wider than the bottom, the hollow body defining an interior volume and the bottom having an interior surface, the side wall of the hollow body having a cross-section perpendicularly to the longitudinal axis, the side wall and the bottom being part of a same thermoplastic piece, wherein the side wall comprises a lower portion tapering in a curved manner toward the bottom, wherein the food composition comprises a set fermented dairy composition in contact with the interior surface of the bottom and extends in the interior volume, wherein the bottom has an outer circular peripheral edge and the interior surface comprises a projection element, in contact with the set fermented dairy composition, protruding inside the container and preventing rotation of the set fermented dairy composition, the projection element comprising a planar projection top without a hollow and perpendicular to the longitudinal axis, wherein the projection element has an outermost peripheral edge line that is annular and continuously spaced from the outer circular peripheral edge of the bottom, the outermost peripheral edge line of the projection element and the outer circular peripheral edge of the bottom each extending entirely in a same base plane of the container which is perpendicular to the longitudinal axis, and wherein, in the base plane of the container, an irregular spacing is defined between the outermost peripheral edge line of the projection element and the outer circular peripheral edge of the bottom, wherein the projection element is spaced radially from the side wall and from the outer circular peripheral edge of the bottom, and wherein the projection element defines an embossment from the base plane having a height lower than 4 mm, wherein the projection element defines a planar top, and a ratio between the surface defined by the planar top and an interior surface of the bottom being at least equal to 1:5.

* * * * *